Nov. 7, 1967    E. M. GIENAPP ETAL    3,350,794
AUTOMATIC VISUAL SCORING TEST APPARATUS AND FILM
Filed July 14, 1965    3 Sheets-Sheet 1
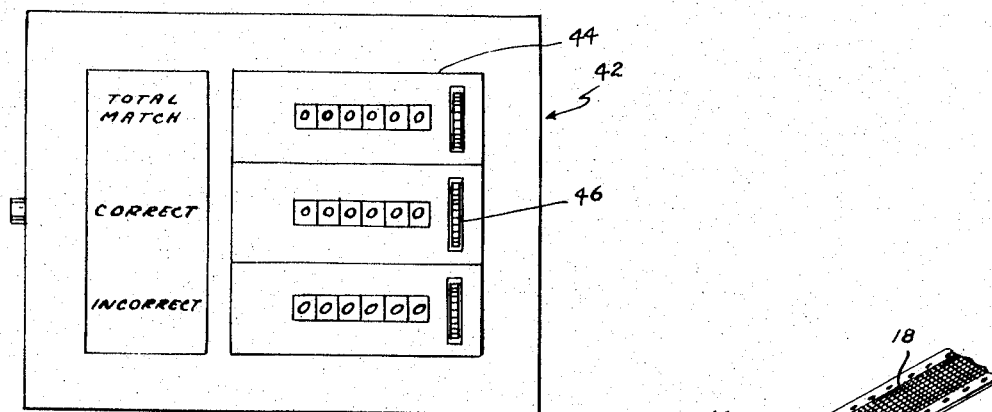
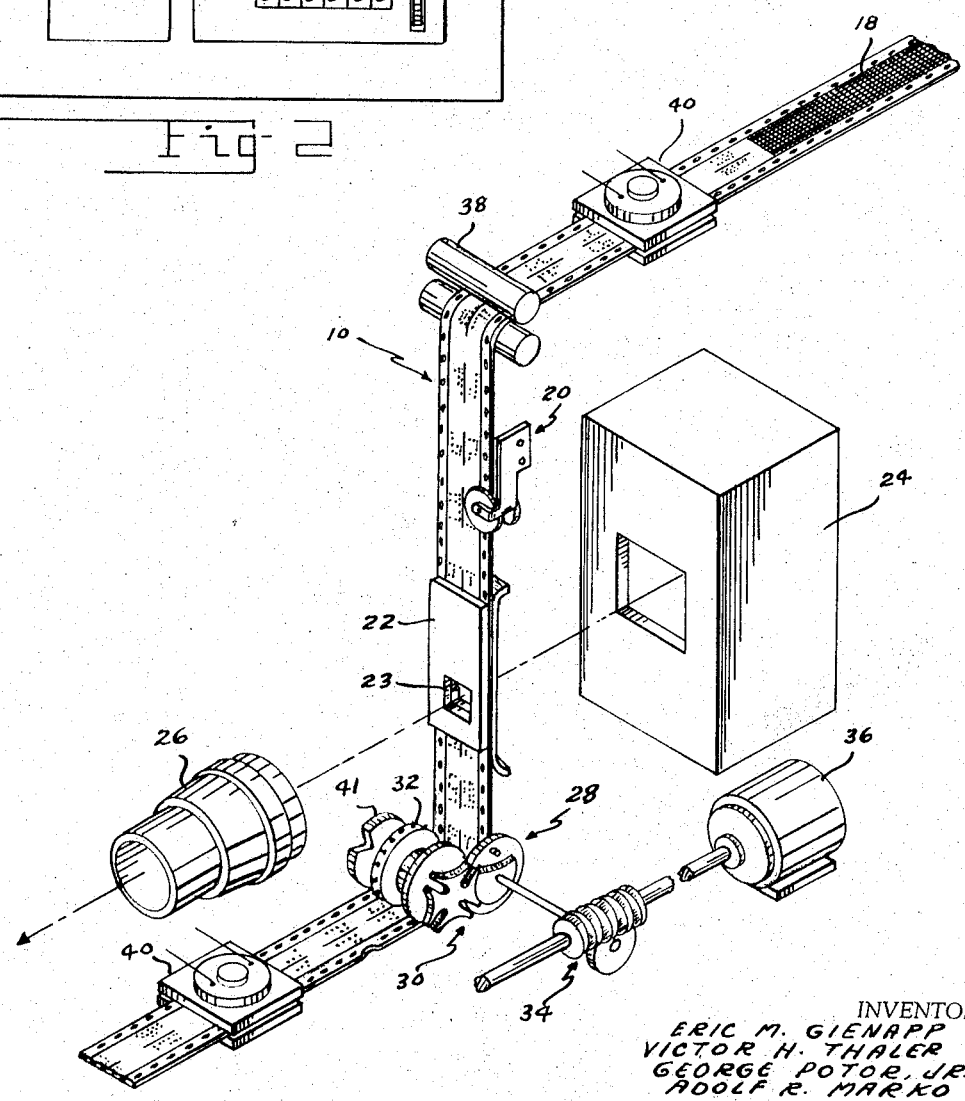
INVENTORS
ERIC M. GIENAPP
VICTOR H. THALER
GEORGE POTOR, JR.
ADOLF R. MARKO
BY Harry A. Herbert Jr.
Louis E. Hay
ATTORNEYS

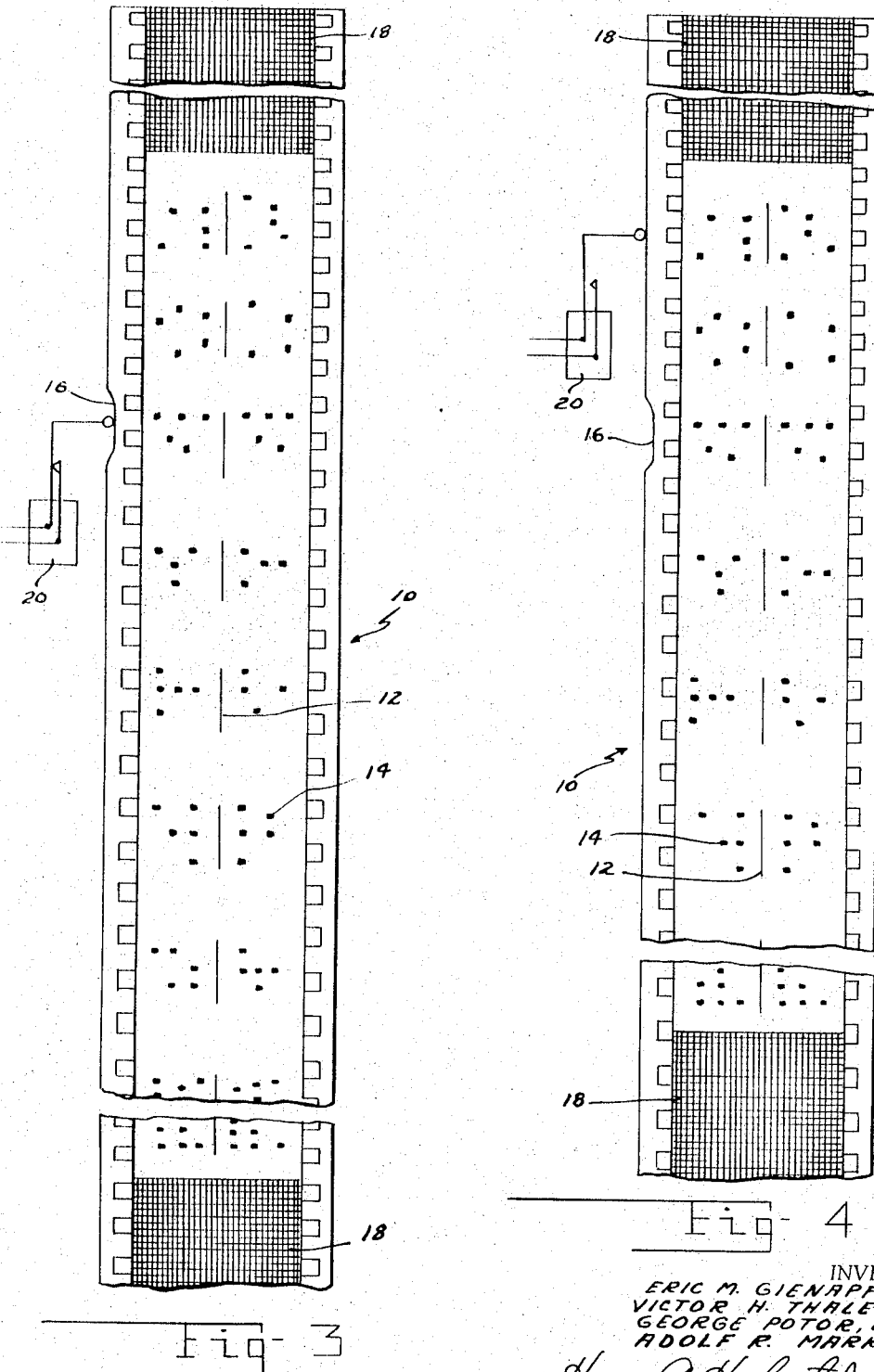

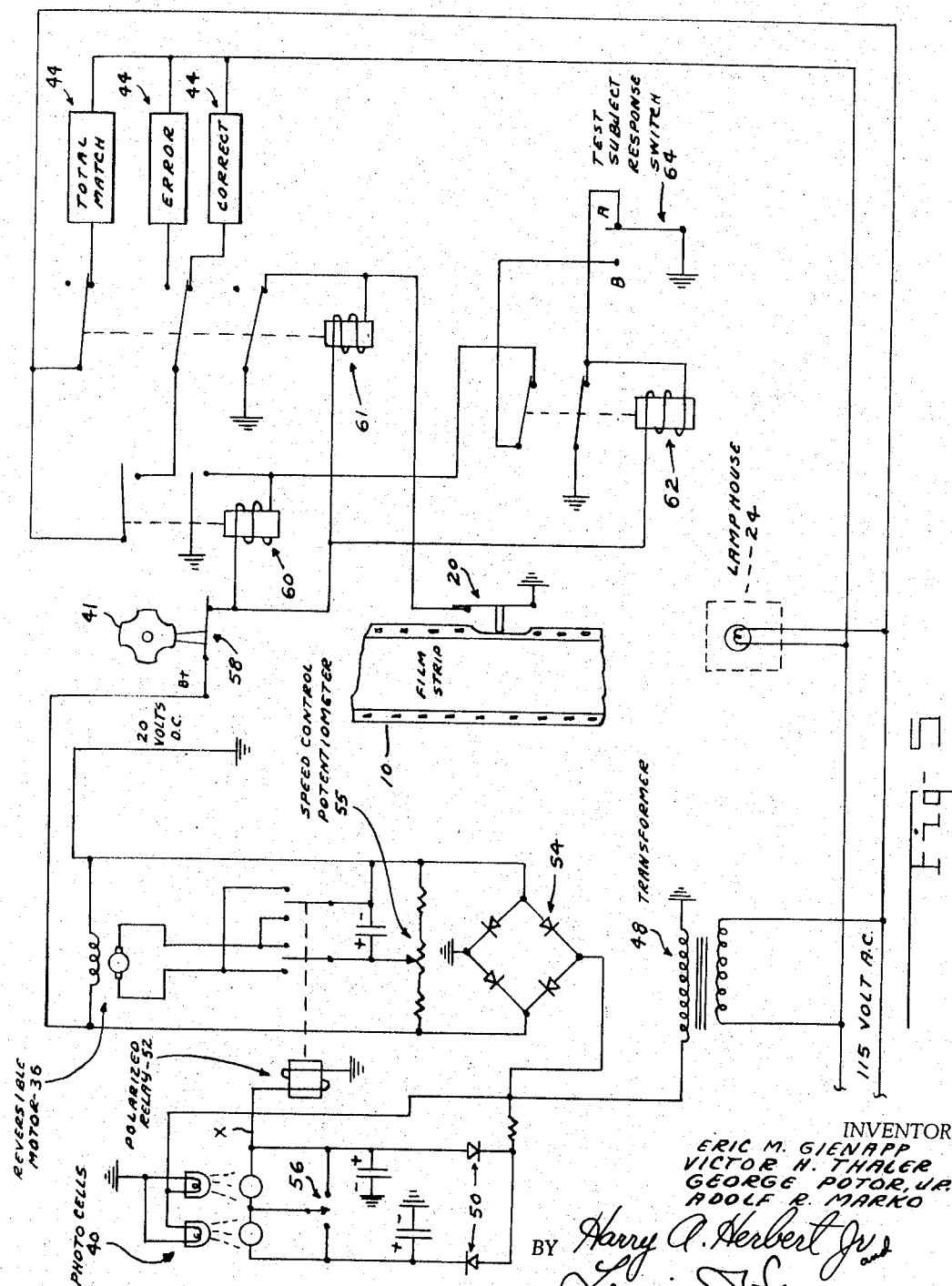

United States Patent Office 3,350,794
Patented Nov. 7, 1967

3,350,794
AUTOMATIC VISUAL SCORING TEST
APPARATUS AND FILM
Eric M. Gienapp, 418 Park Place, Yellow Springs, Ohio 45387; Victor H. Thaler, 5714 Tomberg St., Dayton, Ohio 45424; George Potor, Jr., Rte. 3, Xenia, Ohio 45385; and Adolf R. Marko, 252 W. Garland Ave., Fairborn, Ohio 45324
Filed July 14, 1965, Ser. No. 472,068
2 Claims. (Cl. 35—48)

ABSTRACT OF THE DISCLOSURE

An automatic visual scoring test apparatus comprising a strip film projector having a reversible impulse film transport mechanism; a strip film having a plurality of frames each of which is divided into half-areas with images thereon, the images on the half-areas of only a portion of the frames matching, and further having leader strips on each end adapted to engage the reversible impulse film transport mechanism on the projector to reverse the direction of the film transport through the projector; and a manually actuatable digital counter means engaging the film strip and scoring a person being tested in his accuracy of detecting the frames on the film strip in which the images on the half-areas match.

---

The invention described herein may be manufactured and used by or for the United States Government for governmental purposes without the payment to us of any royalty thereon.

This invention relates to photographic projectors and film, and more specifically to projectors using strip film comprising a plurality of frames coded in a manner to facilitate scoring the person undergoing test.

Briefly stated, the apparatus and film to be disclosed provide a means whereby the test score made by the person undergoing test will be automatically recorded; and which does not require an operator or a conductor of the test. These results are accomplished with an apparatus which will project the strip film over and over for a prolonged period of time during which the person undergoing test is being automatically scored.

As will be more fully disclosed, the person undergoing test is asked to signify by pressing a button on the apparatus when two adjacent groups of blocks on each frame of the film are identical; the apparatus automatically recording his correct and his incorrect answers. This test can become extremely monotonous, when conducted for a prolonged period of time, especially when the frames move at a rate of one frame per second or less.

The apparatus to be disclosed was invented for use in connection with the selection of prospective astronauts. Personnel selected for space flights must undergo a long series of tests such as physical, psychlological, etc. The specific tests for which the present apparatus is used relate to fatigue tests under prolonged monotonous conditions such as are encountered on prolonged space flights. In spite of the monotony, an astronaut must maintain his alertness to emergency conditions which usually arise without warning. The monotony is simulated on the film by having the blocks on most frames mismatched; the person undergoing test being scored on his ability to detect the few single frames on which the block groups are matched. Since the frames on which the block groups match are disposed between series of frames in which the block groups are mismatched, the person undergoing test must be able to almost instantly detect a frame on which the block groups match.

The primary object of this invention is to provide an apparatus which will measure the visual and mental alertness of a person under monotonous conditions during a prolonged period of time.

Another object of this invention is to provide an apparatus for making fatigue studies in which the test scores may be read directly on a digital recorder.

A further object of this invention is to provide an apparatus for making fatigue studies which requires no manual operation other than to start and stop the apparatus.

An important object of this invention is to provide a strip film using apparatus for making fatigue studies which will project the same strip film forward and backward, over and over, until the apparatus is stopped.

Yet another object of this invention is to provide a strip film having a series of individual frames having two groups of characters on each frame, each of the groups either matching or not matching.

A still further object of this invention is to provide a strip film having a series of individual frames having two groups of characters on each frame which either match or do not match, the film being coded in a detectable manner indicating the matched and nonmatched frames.

Another important object of this invention is to provide, in combination, a projector for projecting a strip film; the projector and the film having means in combination for reversing and reprojecting the film forward and backward, over and over.

Additional objects, advantages and features of the invention reside in the construction, arrangement and combination of parts involved in the embodiment of the invention as will appear from the following description and accompanying drawings, wherein FIG. 1 is a schematic view of a projector and film strip in accordance with this invention;

FIG. 2 is a front elevation of the counter box used to indicate the test score of the person undergoing test;

FIG. 3 is a portion of the film strip used with the projector;

FIG. 4 is a portion of the film strip similar to the portion shown on FIG. 3; and FIG. 5 is a schematic of the wiring circuit.

Referring to FIG. 3 and FIG. 4, the film strip 10 is made from conventional 35 mm. film stock. Each frame is substantially divided into a left and a right half-area by a dividing line 12 as shown. The left and right halves on each frame contain a plurality of square blocks 14 which are arranged in various patterns as shown. Examination of the film strips will show that the blocks on the left half-area of a given film frame will match the blocks on the right half-area on only one of the frames shown; that frame having a code notch 16 in the edge of the film strip adjacent to the frame with the matching block pattern.

The film strip may be produced by arranging a plurality of black block figures into a desired pattern on an illuminated white background having a black central dividing line representing line 12 on the film strip, and then photographing the block figures. The block figures are rearranged for each subsequent frame on the film strip. Square block figures were used because they were easy to cut from heavy opaque paper. Other shapes such as circles, triangles, or bars may be used, if desired. The various shapes may also be mixed on the film frames for variety. Although the film strip has the general appearance of movie film, in reality it is a series of individual frames, each of which is without image continuity with the adjacent frames as is required on movie film.

During filming, the leader 18 at each end of the film strip is exposed to light in order for it to be opaque after development. The purpose of the opaque leaders is to automatically reverse the direction of the film transport through the projector, as will be more fully described hereinafter.

A matched frame detector 20 is shown adjacent to the film strips shown on FIG. 3 and FIG. 4. The matched frame detector, whose function and operation will be more fully described hereinafter, may be a microswitch mounted on the projector and biased to engage the edge of the film strip as shown. When the microswitch engages an unnotched portion of the film strip, as shown on FIG. 4, the contact points of the switch are in their normally open position. When the microswitch engages the code notch 16, as shown on FIG. 3, the contacts of the switch close to complete the match detection circuit, as will be more fully disclosed.

The film strip 10 is projected through a projector shown in schematic on FIG. 1. The projector has the general appearance of a conventional movie projector, but is in reality a slide projector in that the film strip advances at relatively long time intervals; and as previously stated, there is no image continuity between adjacent frames on the film strip. Since the projector is a slide projector in principle of operation, no shutter is required as in a movie projector. The principle elements of the projector are: (1) a film gate 22 having a rectangular aperture 23 on the optical axis of the projector, (2) a lamp house 24 containing a source of illumination, (3) a lens system 26, and (4) a reversible impulse film transport mechanism 28 for advancing the film strip. The transport mechanism 28 includes a conventional Geneva movement mechanism 30 having a drive sprocket wheel 32 which engages the film strip in the conventional manner. The drive mechanism is actuated by a reversible motor 36 acting through worm gear and pinion 34 in the conventional manner. The projector is provided with suitable film guide spool 38, where desired. The projector is further provided with conventional film reels (not shown).

In addition to the conventional elements of the projector as above described, the projector of this invention includes three additional elements: (1) the matched frame detector microswitch 20, only the extending arm portion of which is shown on FIG. 1, (2) two film reversing means such as photocell units 40, one each of which is mounted on opposite sides of the film gate in such position that the film strip passes through the photocell units, and (3) a frame advance and circuit clearing means 41. The frame advance and circuit clearing means may be a disk having four equally spaced detents on the periphery corresponding to the four slots in the Geneva movement and supported for rotation with sprocket wheel 32 as shown. A switch (not shown on FIG. 1) similar to microswitch 20 engages the frame advance and circuit clearing means 41. This switch and its functions will be more fully described in connection with the wiring schematic shown on FIG. 5. As will also be more fully described with the circuit shown on FIG. 5, the film is transported through the projector in either direction until such time as the opaque leader 18 on the film strip enters the adjacent photocell unit which then causes the reversible motor 36 to run in the opposite direction to reverse the direction of the film transport through the projector. The reversed direction of the film transport continues until the opaque leader on the opposite end of the film enters its adjacent photocell unit, at which time, the direction of the film transport is again automatically reversed. Other means may be used to automatically reverse the film. For example, the leaders may have a code notch similar to code notch 16 of FIG. 3 and FIG. 4. The code notch in each leader would preferably be in the opposite edge of the film from code notch 16, where it would be engaged by a microswitch in the same manner notch 16 is engaged by microswitch 20.

It will be noted from an examination of the upper end of the film strip shown on FIG. 1, that the film strip will reverse before the last frame is aligned for projection on the optical axis of the projector. These frames are all made to be mismatched frames, or if desired, these surplus frames may be blanks.

The code notch 16 appearing on the film strip of FIG. 3 and FIG. 4 is shown to be on the matched frame. This portrayal was for ease in explaining the purpose of the code notch. Since, as shown on FIG. 1, the matched frame detector 20 must be displaced to avoid interference with film gate 22, the code notch on the film strip must be displaced a like amount. In the schematic FIG. 1, the displacement is three frames.

The front of the counter box 42, used to indicate test scores, is shown on FIG. 2. The counter box contains three conventional electrically actuated, zero-reset digital counters 44, which are manually reset by means of disk knobs 46. Each counter is suitably captioned as shown.

The wiring circuit, shown on FIG. 5, has a 115 volt A.C. imput for powering the projector lamp in lamp house 24 and the three counters 44. The 115-volt input is also reduced to about 20 volts by transformer 48; the 20-volt power supply being used to power the balance of the electrical elements associated with the projector.

Although photocell units 40, on the schematic, are shown to be adjacent to each other, in reality they are on opposite sides of film gate 22 as shown on FIG. 1. The photocell units are powered as shown with rectified current passing through rectifiers 50. Relay 52 is a polarized relay which remains locked in either position until the current flow through the relay coil is reversed. Relay 52 is used to control the direction of rotation of reversible motor 36, the motor being powered by rectified current passing through rectifiers 54 and speed control potentiometer 55.

The frames of the film strip between the two opaque leaders are of the same general density level, and as these frames are passing through the two photocell units, the photocell units pass equal current to cause the voltage at point "$x$" to be zero. However, when either of the opaque leader ends on the film strip enters one of the photocell units, its current flow changes to produce an unbalanced condition which produces a voltage at point "$x$" which actuates relay 52 to reverse the direction of motor 36. Manual switch 56 is a center-off, double-throw, single-pole, momentary switch, which may be used at any time to effect reversal of the film strip transport through the projector.

The balance of the circuit to be described relates to the actuation of the three digital counters 44. The principal elements of this portion of the circuit include the matched frame detector microswitch 20 which engages the edge of film strip 10, a similar microswitch 58 which engages the periphery of the frame advance and circuit clearing means 41, three locking relays 60, 61 and 62 which actuate switches as indicated, and a test subject response switch 64 which is manually actuated by the person undergoing test. The blade of switch 64 is normally against contact A and is moved to contact B when the person undergoing test believes he is viewing a matched frame and wishes to numerically advance the "correct" counter 44.

When the contacts in microswitches 20 and 58 are closed as shown, relays 61 and 62 are in the down position to close the contacts as indicated. The "total match" counter 44 advances one digit. If the person undergoing test moves the response switch 64 to contact terminal B, the circuit through relay 60 will be completed and the switch controlling the flow of the 115-volt current will close to cause the "correct" counter 44 to advance one digit. Since relays 60, 61 and 62 are locking relays, they will stay in the down position until the current is interrupted by microswitch 58. This feature prevents the person undergoing test from improving his score by jiggling switch 64. The relays are returned to their initial open position when the current is interrupted, upon frame advance, by the frame advance and circuit clearing means 41. The circuit is now in condition for a repeat of the above procedure the next time a matched frame closes microswitch 20.

When an unmatched frame is being projected, microswitch 20 will be open, and microswitch 58 will be closed to complete the circuit through relay 62. In this condition, relays 60 and 61 are open and the center switch on relay 61 is connected to the "error" counter 44. If the response switch 64 is not moved to contact B, none of the counters 44 will advance. If, however, the response switch is moved to contact B, the circuit through relay 60 will be completed and an error will be recorded on the "error" counter 44.

The circuit shown permits: (1) recording the total number of matched frames which were projected during the test run, (2) the number of correct responses during the time a matched frame was being projected, the difference between the readings on the "total match" and the "correct" counters indicating the number of matched frames which were passed, and (3) the "error" counter will record the number of times the person undergoing test erred in believing he was viewing a matched frame.

Because of the construction of the frame and circuit clearing means 41, the person undergoing test can advance the "correct" counter only during that period when the matched frame is actually being projected. This is because the current flowing through microswitch 58 is interrupted as soon as the Geneva movement of transport mechanism 28 commences to advance the film strip to project the next film frame and simultaneously open microswitch 20.

In the aparatus as constructed, relays 60, 61, and 62, together with their related switches, are all contained within counter box 42. The counter box is on an extension cable long enough to permit placing the counter box in a room adjacent to the room in which the person undergoing test is seated. With this arrangement, the person undergoing test can not hear the action of the relays and can not view his test score.

The opaque film leader strips 18, in connection with the photocell units 40, permit a continuous automatic test procedure. The test can be commenced and stopped at any point on the film. All that is necessary is to clear all the counters before the projector is turned on.

Apparatus and film in accordance with this invention may easily be adapted to giving many tests other than the one specifically described. For example, the film may be made with figures such as animals and birds for testing very young children, or mentally retarded adults. Or, arithmetic tests may be given to children with a matched frame reading for example "8+3=5+6" and an unmatched frame reading "8+3=5+7."

It is to be understood that the embodiments of the invention as shown and described is to be regarded as illustrative only and that the invention is susceptible to variations, modifications and changes within the scope of the appended claims.

We claim:

1. An automatic visual scoring test apparatus and film comprising: a strip film projector having a film gate with a projection aperture on an optical axis and a reversible impulse film transport mechanism; an elongated film strip comprising an elongated central section having a plurality of frames sequentially arranged to be longitudinal, each of said frames being substantially divided into laterally adjacent half-areas having at least one image thereon and with the image on one half-area of a portion of the frames matching the image on the adjacent half-area of the same frame, each matched frame having at least one non-matched frame on each end thereof and each matched frame being coded to indicate the matched condition of the images on the laterally adjacent half-areas of the frame, a first coded leader at one end of said elongated central section, and a second coded leader at the opposite end of said elongated central section, said elongated film strip engaging the reversible impulse film transport mechanism in said projector for sequential transport of the frames on said film strip through the film gate in said projector; two film reversing means one each of which is mounted on said projector at opposite sides of the film gate and communicating with the reversible impulse film transport mechanism in said projector, each of said film reversing means engaging the coded leader on one end of the central section on said film strip when the final frame to be projected in one direction has been transported beyond the projection aperture in the film gate of said projector and to reverse the direction of the reversible impulse film transport mechanism of said projector; a first digital counter means; detector means joined to said projector for detecting each coded frame on said film strip when the coded frame is in projection position in the film gate of said projection and communicating with said first counter means for automatically advancing said first counter means one digit; a second digital counter means; a manually acuatable response means joined to said detector means and said second counter means for advancing said second counter means one digit when said response means is actuated during the time a coded frame is in the projection position in said projector; a third digital counter means; and connecting means joining said detector means and said response means to said third counter means for advancing said third counter means one digit when said response means is actuated when said detector means is out of engagement with a coded frame on said film strip.

2. An automatic visual scoring test apparatus and film comprising: a strip film projector having a film gate with a projection aperture on an optical axis and a reversible impulse film transport mechanism; an elongated film strip comprising an elongated central section having a plurality of frames sequentially arranged to be longitudinal, each of said frames being substantially divided into laterally adjacent half-areas having at least one image thereon and with the image on one half-area of a portion of the frames matching the image on the adjacent half-area of the same frame, each matched frame having at least one non-matched frame on each end thereof, said central section further having for each matched frame thereon a code notch in an edge of said central section, a first substantially opaque leader at one end of said elongated central section, and a second substantially opaque leader at the opposite end of said elongated central section, said elongated film strip engaging the reversible impulse film transport mechanism in said projector for sequential transport of the frames on said film strip through the film gate in said projector; two photocell units one each of which is mounted on said projector at opposite sides of the film gate and communicating with the reversible impulse film transport mechanism in said projector, each of said photocell units engaging the opaque leader on one end of the central section on said film strip when the final frame to be projected in one direction has been transported beyond the projection aperture in the film gate of said projector and to reverse the direction of the reversible impulse film transport mechanism of said projector; a first digital counter means; detector means joined to said projector for engaging a code notch in the central section of said film strip when the frame to which the code notch is related is in projection position in the film gate of said projector and communicating with said first counter means for automatically advancing said first counter means one digit; a second digital counter means; a manually actuatable response means joined to said detector means and said second counter means for advancing said second counter means one digit when said response means is actuated during the time said detector means is engaging a code notch in said film strip; a third digital counter means; and connecting means joining said detector means and said response means to said third counter means for advancing said third counter means one digit when said response means is actuated when said detector means is out of engagement with a code notch in said film strip.

References Cited

UNITED STATES PATENTS

| | | | |
|---|---|---|---|
| 2,505,965 | 5/1950 | Holmes | 352—83 |
| 2,674,009 | 4/1954 | Williams | 352—236 |
| 3,100,351 | 8/1963 | Priednieks | 35—9 |
| 3,117,382 | 1/1964 | Schutzberger | 35—9 |
| 3,164,059 | 1/1965 | Turrentine | 352—123 |
| 3,259,011 | 7/1966 | Yamada | 352—236 |

FOREIGN PATENTS 279,593  7/1966  Great Britain.

EUGENE R. CAPOZIO, *Primary Examiner.*

W. NEILSEN, *Assistant Examiner.*